Patented July 5, 1938

2,122,997

UNITED STATES PATENT OFFICE 2,122,997

METHOD OF RECOVERING ZINC SULPHATE DIHYDRATE

Frederick C. Abbott and Henry W. Doennecke, Tulsa, Okla., assignors to Ozark Chemical Company, Tulsa, Okla., a corporation of Delaware No Drawing. Application April 19, 1937, Serial No. 137,791

8 Claims. (Cl. 23—125)

This invention relates to the commercial recovery of crystalline zinc sulphate dihydrate ($ZnSO_4.2H_2O$), from zinc calcines or other zinc bearing materials.

In the treatment of such materials for the recovery of the zinc it is customary to first leach the roasted zinc calcines with sulphuric acid or otherwise reduce their zinc content to a solution of some zinc compound, for example zinc sulphate, then to extract impurities and the like from the solution, and finally to recover the zinc as the same or some other compound or as the pure metal, depending upon the nature of the final recovery process.

As far as we are aware, however, it has heretofore been substantially impossible to recover zinc sulphate dihydrate from substantially neutral zinc sulphate solutions in commercial quantities. This is largely due to the extreme difficulty of treating or even producing concentrated solutions of this salt in accordance with the methods heretofore employed because of the tendency of the solutions to increase rapidly in viscosity during concentration prior to separation in solid form of any substantial part of the zinc sulphate content, and also to the tendency of zinc sulphate in relatively concentrated substantially neutral solutions to solidify in large masses as one of its higher hydrates or a mixture of several of them.

It is therefore a principal object of the present invention to provide a novel method of effecting a commercial recovery from zinc sulphate solutions of substantially pure zinc sulphate dihydrate in the form of crystals well adapted for industrial purposes.

Another object is to obtain a commercial recovery of zinc sulphate dihydrate in crystalline form by initial concentration of a substantially neutral relatively weak zinc sulphate solution in a novel manner and subsequent treatment of the concentrate to crystallize and precipitate therefrom a relatively large proportion of its contained zinc sulphate.

A further object is to provide a cyclic method of zinc sulphate recovery in which the liquor from which the precipitated crystals of zinc sulphate dihydrate have been removed is used for treating zinc bearing materials in such a way as to take up additional quantities of zinc sulphate for subsequent recovery as the crystalline dihydrate.

Other objects, purposes and advantages of the invention will hereinafter more fully appear or will be understood from the following description of one manner of performing it to obtain a commercial recovery of crystalline zinc sulphate dihydrate from zinc bearing roasted calcines.

Considered broadly, our method contemplates the recovery of zinc sulphate dihydrate by treatment of zinc sulphate solutions generally and produced in any desired manner, but to facilitate adequate disclosure of the invention it will be herein described primarily with reference to the treatment of such a solution obtained by leaching roasted calcines with a liquor containing free sulphuric acid substantially in accordance with customary practice. By leaching the calcines with a 20% $H_2SO_4$ liquor a substantially neutral zinc sulphate solution of about 20% to 30% zinc sulphate concentration can be produced and after its usual purification to remove iron, cadmium, copper and other constituents whose presence is not desired, this solution is entirely suitable for treatment in accordance with the invention, but of course the latter may be employed as well for treatment of substantially neutral zinc sulphate solutions of virtually any initial concentration.

Thus in treating such zinc sulphate solution containing for example about 25% zinc sulphate, we first heat a quantity of the solution by submerging in it a burner of suitable form adapted to effect combustion of any convenient fuel beneath its surface and operate the burner in such way as to discharge therefrom directly into the solution the gaseous products of combustion, thereby obtaining highly efficient heat transfer and concurrently effecting violent agitation of the body of the solution so as to heat it uniformly throughout. The solution is thus quickly raised to about 203° F. which is somewhat below its normal atmospheric boiling point, at about which temperature, with the aid of the hot combustion products bubbling through the solution, rapid evaporation of its water content is initiated. Heating and evaporating in this manner are continued, with gradual rise in temperature as the concentration increases, until a material proportion of the water content has been removed and the concentration thus increased preferably to about 40% to 60% zinc sulphate or above if desired, although much above 70% is usually impractical because of the high viscosity of the concentrate due to progressive formation of colloidal zinc sulphate as the concentration increases.

After the concentration to the desired extent and before appreciable cooling has taken place, the concentrated solution or slurry is treated by the addition thereto of sulphuric acid in sufficient quantity to provide a material proportion of free acid in solution which treatment rapidly brings about heavy precipitation as zinc sulphate dihydrate of a large part of the zinc sulphate content of the slurry by converting the colloidal zinc sulphate into crystalline zinc sulphate dihydrate and also precipitating some crystalline dihydrate from the solution itself.

More specifically, by adding sufficient sulphuric acid to afford 5% free sulphuric acid in solution we obtain from a 60% zinc sulphate solution a recovery of about 72.6% of its zinc sulphate content in crystalline form as the dihydrate, while by increasing the amount of free acid in solution to about 15% we obtain approximately 81.5% recovery. We have found, however, that about 5% free sulphuric acid in solution produces an appreciably higher yield of precipitated zinc sulphate dihydrate per pound of acid used than when a larger proportion is employed in a slurry of the same concentration, while using a slurry of different concentration results in a different yield of the precipitate with the same amount of acid.

The following table shows the various results derived from solutions of various concentrations after heating and water evaporation by submerged combustion as above described and subsequent addition to the hot concentrated solutions of sufficient sulphuric acid to produce 5%, 10% and 15% respectively of free acid therein; the zinc sulphate is recovered in the form of crystalline zinc sulphate dihydrate ($ZnSO_4.2H_2O$) but the water content of the latter is not included in the figures relating to the total recovery although it does enter into those relating to the yield of zinc sulphate dihydrate in pounds per pound of sulphuric acid:

| Solution treated to— | Concentration of $ZnSO_4$ solution treated— | | | | |
|---|---|---|---|---|---|
|  | 40% | 45% | 50% | 55% | 60% |
| 5% free $H_2SO_4$: |  |  |  |  |  |
| Percent of $ZnSO_4$ recovery | 21.0 | 38.2 | 52.0 | 63.3 | 72.6 |
| Lb. $ZnSO_4.2H_2O$ per lb. $H_2SO_4$ | 2.18 | 5.07 | 8.86 | 14.08 | 21.67 |
| 10% free $H_2SO_4$: |  |  |  |  |  |
| Percent of $ZnSO_4$ recovery | 34.6 | 48.8 | 60.0 | 69.5 | 77.3 |
| Lb. $ZnSO_4.2H_2O$ per lb. $H_2SO_4$ | 1.83 | 3.29 | 5.21 | 7.84 | 11.77 |
| 15% free $H_2SO_4$: |  |  |  |  |  |
| Percent of $ZnSO_4$ recovery | 46.6 | 58.2 | 67.5 | 75.1 | 81.5 |
| Lb. $ZnSO_4.2H_2O$ per lb. $H_2SO_4$ | 1.68 | 2.68 | 3.99 | 5.80 | 8.42 |

From this table it will be apparent that the proportion of zinc sulphate recovered increases with increased concentration of the initial solution and with increased sulphuric acid addition thereto, and we have observed that the solubility of zinc sulphate in sulphuric acid solutions appears to vary substantially inversely as the sulphuric acid concentration in such manner that the sum of the concentrations of these two substances remains substantially constant at about 38% thus accounting for the larger precipitation of zinc sulphate obtainable from the more concentrated solutions thereof as well as from the use of a greater proportion of sulphuric acid.

With regard to the relation between the yield and the quantity of sulphuric acid used, however, the above table also shows that about 5% sulphuric acid in a solution of given zinc sulphate concentration produces an appreciably larger yield in relation to the quantity of acid than does a materially larger quantity, and we have found that the yield per pound of sulphuric acid decreases rapidly above 15% free acid in the solution.

Thus the concentration to which the zinc sulphate solution is carried by submerged combustion before treatment with sulphuric acid, as well as the amount of sulphuric acid used, may be varied within limits as desired and will correspondingly produce varying yields.

After the desired quantity of acid has been thoroughly mixed with the concentrated zinc sulphate solution or slurry and precipitation effected the resultant slurry is filtered, centrifuged or otherwise treated to separate the mother liquor from the precipitated crystalline zinc sulphate dihydrate which is then in marketable condition. Of course if it is desired to manufacture therefrom zinc sulphate monohydrate ($ZnSO_4.H_2O$) or anhydrous zinc sulphate ($ZnSO_4$), the dihydrate can readily be converted by removal of one or both of its molecules of water of crystallization by heating in a rotary dryer or other suitable apparatus.

The mother liquor separated from the precipitate, containing a material quantity of sulphuric acid as well as some residual zinc sulphate still in solution, is preferably conserved and used for leaching more of the calcines or other zinc bearing material either alone or together with fresh sulphuric acid, whereby its free acid content is neutralized through its reaction with the zinc and its zinc sulphate content thereby materially increased so as to permit it to be again treated as hereinabove described to recover additional zinc sulphate dihydrate.

The precipitate is in a form which permits it to be readily separated from the mother liquor by filtering or centrifuging, and this constitutes an important advantage of the method. Moreover we have observed that while the hot concentrated solutions of zinc sulphate we produce in the performance of our method may freeze as a solid mass on even very slight temperature reduction subsequent to concentration and prior to addition of the sulphuric acid due to the presence of a large amount of colloidal zinc sulphate in the slurry, after the acid has been added there is no longer any necessity for maintaining the elevated temperature requisite to preserve the mass in a fluid state as the acid induces almost immediate crystallization and precipitation of sufficient of the zinc sulphate content to prevent such freezing upon cooling to room temperature. The centrifuging or filtering may therefore be carried out at such temperature if desired, although of course in large scale production it may be more convenient to effect the separation while the slurry is still hot so that the contained heat in the mother liquor will be conserved to facilitate the subsequent leaching operations if the liquor is employed therefor.

While we have herein described with considerable particularity one way of performing our method and have set forth figures giving the results of treatment of various solutions in certain ways, it will of course be understood that this is for purposes of illustration only and that we do not desire or intend to limit or confine ourselves thereto in any way, or to any specific apparatus for carrying out the method of the invention in the performance of which changes and modifications will readily occur to those skilled in the art and may be made if desired without departing from its spirit and scope as defined in the appended claims.

Having thus described our invention, we claim and desire to protect by Letters Patent of the United States:

1. A method for the commercial production of zinc sulphate dihydrate from a substantially neutral zinc sulphate solution which comprises heating the solution by combustion of fuel beneath its surface and direct discharge of combustion gases thereinto to thereby extract sufficient water to concentrate the solution to above about 40% zinc sulphate and produce colloidal zinc sulphate therein, then acidifying the concentrate to at least about 5% free acid in solution to convert the colloidal zinc sulphate to crystalline zinc sulphate dihydrate and precipitate additional crystalline zinc sulphate dihydrate, and finally mechanically removing the precipitate.

2. In a commercially useful method of recovering zinc sulphate dihydrate from a substantially neutral fluid mass thereof containing above about 40% zinc sulphate part of which is in colloidal suspension, the step of introducing sulphuric acid into the mass to acidify it to not exceeding about 15% free acid in solution to thereby convert the colloidal zinc sulphate to crystalline zinc sulphate dihydrate and precipitate additional crystalline zinc sulphate dihydrate.

3. A cyclic method of recovering zinc sulphate dihydrate from zinc bearing material which comprises leaching a quantity of the material with a sulphuric acid containing solution to obtain a substantially neutral solution of zinc sulphate, concentrating this solution to substantially increased viscosity while changing part of the zinc sulphate to colloidal state, acidifying the concentrate with sulphuric acid to not more than about 15% free acid in solution to convert the colloid to crystalline zinc sulphate dihydrate and precipitate additional crystalline zinc sulphate dihydrate, then separating the precipitate and the mother liquor and leaching a further quantity of the material with said liquor to obtain additional substantially neutral solution of zinc sulphate for further recovery of zinc sulphate dihydrate therefrom.

4. A cyclic method of recovering zinc sulphate dihydrate from zinc bearing material which comprises leaching a quantity of the material with a sulphuric acid containing solution to obtain a substantially neutral solution of zinc sulphate, concentrating this solution to above about 40% zinc sulphate by submerged combustion of fuel and discharge of combustion gases thereinto to change a material part of the zinc sulphate in solution to colloidal zinc sulphate in suspension, acidifying the concentrate to not more than about 15% free acid in solution by the addition of sulphuric acid thereto to crystallize the colloid and precipitate zinc sulphate dihydrate from the solution, then separating the precipitate from the mother liquor and leaching an additional quantity of the material with the latter, and again similarly concentrating and acidifying the resulting zinc sulphate solution.

5. In a cyclic method of recovering zinc sulphate dihydrate from zinc bearing material, the steps of preparing from a quantity of the material a substantially neutral relatively highly concentrated zinc sulphate slurry containing colloidal zinc sulphate, acidifying said slurry to not more than about 15% free acid in solution to precipitate crystalline zinc sulphate dihydrate therein, separating the precipitate from the mother liquor, and leaching a further quantity of the material with the liquor to obtain additional substantially neutral zinc sulphate solution.

6. A method for the commercial production of zinc sulphate dihydrate from a substantially neutral zinc sulphate solution which comprises heating the solution to concentrate it to above about 40% zinc sulphate and produce colloidal zinc sulphate therein, then acidifying the concentrate by addition of sulphuric acid to not more than about 15% free acid in solution to convert the colloidal zinc sulphate to crystalline zinc sulphate dihydrate and precipitate additional crystalline zinc sulphate dihydrate, and finally mechanically removing the precipitate.

7. A method for the commercial production of zinc sulphate dihydrate from a substantially neutral zinc sulphate solution which comprises heating the solution by combustion of fuel beneath its surface and direct discharge of combustion gases thereinto to thereby evaporate a material part of the water content of the solution and reduce it to a viscous slurry containing colloidal zinc sulphate, then adding sulphuric acid to produce about 5% to about 15% free acid in solution in the slurry, convert the colloidal zinc sulphate to crystalline zinc sulphate dihydrate and precipitate additional crystalline zinc sulphate dihydrate from the solution, and finally separating the crystals from the mother liquor.

8. A method for the commercial production of zinc sulphate dihydrate from a substantially neutral zinc sulphate solution which comprises heating the solution by combustion of fuel beneath its surface and direct discharge of combustion gases thereinto to thereby extract sufficient water therefrom to concentrate the solution and change a material proportion of its contained zinc sulphate to colloidal state, then acidifying the concentrate with sulphuric acid to produce about 5% to about 15% free acid in solution and convert the colloidal zinc sulphate to crystalline zinc sulphate dihydrate, and finally removing the crystalline dihydrate from the fluid.

FREDERICK C. ABBOTT.
HENRY W. DOENNECKE.